United States Patent
Lee et al.

(10) Patent No.: US 9,838,325 B2
(45) Date of Patent: Dec. 5, 2017

(54) RECEIVER-BASED METHODS, SYSTEMS, AND COMPUTER READABLE MEDIA FOR CONTROLLING TCP SENDER BEHAVIOR IN MOBILE COMMUNICATIONS NETWORKS WITH LARGE BUFFER SIZES

(71) Applicant: North Carolina State University, Raleigh, NC (US)

(72) Inventors: Kyunghan Lee, Cary, NC (US); Injong Rhee, Apex, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 15/263,309

(22) Filed: Sep. 12, 2016

(65) Prior Publication Data

US 2017/0070438 A1    Mar. 9, 2017

Related U.S. Application Data

(63) Continuation of application No. 14/349,552, filed as application No. PCT/US2012/058731 on Oct. 4, 2012, now Pat. No. 9,444,688.

(Continued)

(51) Int. Cl.
*H04L 12/26*  (2006.01)
*H04L 12/807*  (2013.01)
(Continued)

(52) U.S. Cl.
CPC .......... *H04L 47/27* (2013.01); *H04L 41/0896* (2013.01); *H04L 47/225* (2013.01);
(Continued)

(58) Field of Classification Search
CPC ..... H04L 47/10; H04L 47/27; H04B 7/18584; H04W 28/0273; H04W 28/0289
See application file for complete search history.

(56) References Cited

U.S. PATENT DOCUMENTS 7,304,951 B2   12/2007  Rhee
9,444,688 B2   9/2016  Lee et al.
(Continued)

FOREIGN PATENT DOCUMENTS

EP    1 096 737 A2    5/2001

OTHER PUBLICATIONS

Notice of Allowance and Fee(s) Due for U.S. Appl. No. 14/349,552 (dated May 10, 2016).

(Continued)

*Primary Examiner* — Alvin Zhu
(74) *Attorney, Agent, or Firm* — Jenkins, Wilson, Taylor & Hunt, P.A.

(57) ABSTRACT

Receiver-based methods for controlling TCP sender behavior in cellular communications networks with large buffer sizes are disclosed. One method includes, at a TCP receiver, receiving packets from a TCP sender. The method further includes determining, based on the packets, a minimum round trip time and a moving average round trip time for cellular network carrying the packets between a TCP sender and a TCP receiver. The method further includes adaptably adjusting a received window size to advertise to the TCP sender based on the minimum round trip time and the moving average round trip time. The method further includes advertising the adjusted received window sizes to the TCP sender.

13 Claims, 14 Drawing Sheets

Related U.S. Application Data

(60) Provisional application No. 61/648,056, filed on May 16, 2012, provisional application No. 61/543,128, filed on Oct. 4, 2011.

(51) Int. Cl.

| | |
|---|---|
| *H04W 48/16* | (2009.01) |
| *H04W 48/18* | (2009.01) |
| *H04L 12/24* | (2006.01) |
| *H04L 12/815* | (2013.01) |
| *H04W 28/02* | (2009.01) |
| *H04W 80/06* | (2009.01) |

(52) U.S. Cl.
CPC ... *H04W 28/0273* (2013.01); *H04W 28/0289* (2013.01); *H04W 48/16* (2013.01); *H04W 48/18* (2013.01); *H04W 80/06* (2013.01)

(56) References Cited

U.S. PATENT DOCUMENTS

| | | |
|---|---|---|
| 2005/0141419 A1 | 6/2005 | Bergamasco et al. |
| 2009/0222553 A1 | 9/2009 | Qian et al. |
| 2010/0020686 A1 | 1/2010 | Lee et al. |
| 2011/0013516 A1 | 1/2011 | Black et al. |
| 2014/0241163 A1 | 8/2014 | Lee et al. |

OTHER PUBLICATIONS

Non-Final Office Action for U.S. Appl. No. 14/349,552 (dated Dec. 17, 2015).
Notification of Transmittal of the International Search Report and the Written Opinion of the International Searching Authority, or the Declaration for International Application No. PCT/US2012/058731 (dated Mar. 22, 2013).
Yang et al., "TCP Congestion Avoidance Algorithm Identification," IEEE, 2011 31st International Conference on Distnbuted Computing Systems, pp. 310-321 (Jun. 2011).
Gettys et al., "Bufferbloat: Dark Buffers in the Internet," ACM Queue, pp. 1-15 (May-Jun. 2011).
Reed, "What's wrong with this picture?", pp. 1-2 (Sep. 2009).
Qian et al., "TCP Revisited: A Frest Look at TCP in the Wild," In Proceedings of the 9th ACM SIGCOMM Conference on Internet Measurement Conference, IMC '09, pp. 1-14 (2009).
Liu et al., "Experiences in a 3G Network: Interplay between the Wireless Channel and Applications," MobiCom.'08, pp. 1-12 (Sep. 2008).
Rhee et al., "CUBIC: A New Tcp-Friendly High-Speed TCP Variant," pp. 1-6 (Jul. 2008).
Wei et al., "FAST TCP: Motivation, Architecture, Algorithms, Performance," IEEE/ACM Transactions on Networking, vol. 14, No. 6, pp. 1246-1259 (Dec. 2006).
Lan et al., "A measurement study of correlations of Internet flow characteristics," pp. 1-28 (Feb. 24, 2006).
Xu et al., "Binary Increase Congestion Control (BIC) for Fast Long-Distance Networks," IEEE INFOCOM, pp. 1-11 (Mar. 2004).
Mathis et al., "Web100: Extended TCP Instrumentation", SIGCOM Comput. Commun., pp. 1-11 (Jul. 2003).
Liu et al., "A framework for opportunistic scheduling in wireless networks," Computer Networks, vol. 41, pp. 451-474 (2003).
Feng et al., "Dynamic Right-Sizing: An Automated, Lightweight, and Scalable Technique for Enhancing Grid Performance," In Proceedings of the 7th IFIP/IEEE International Workshop on Protocols for High Speed Networks, pp. 69-83 (Apr. 22-24, 2002).
Athuraliya et al., "REM: Active Queue Management," IEEE Network, pp. 48-53 (May/Jun. 2001).
Floyd et al., "The NewReno Modification to TCP's Fast Recovery Algorithm," RFC 2582, pp. 1-37 (Apr. 1999).
Brakmo et al., "TCP Vegas: New Techniques for Congestion Detection and Avoidance," TR 94 04, pp. 1-19.
(Feb. 16, 1994). Floyd et al., "Random Early Detection Gateways for Congestion Avoidance," IEEE, vol. 1, No. 4, pp. 397-413.

(A) ROUND-TRIP TIME (B) CONGESTION WINDOW

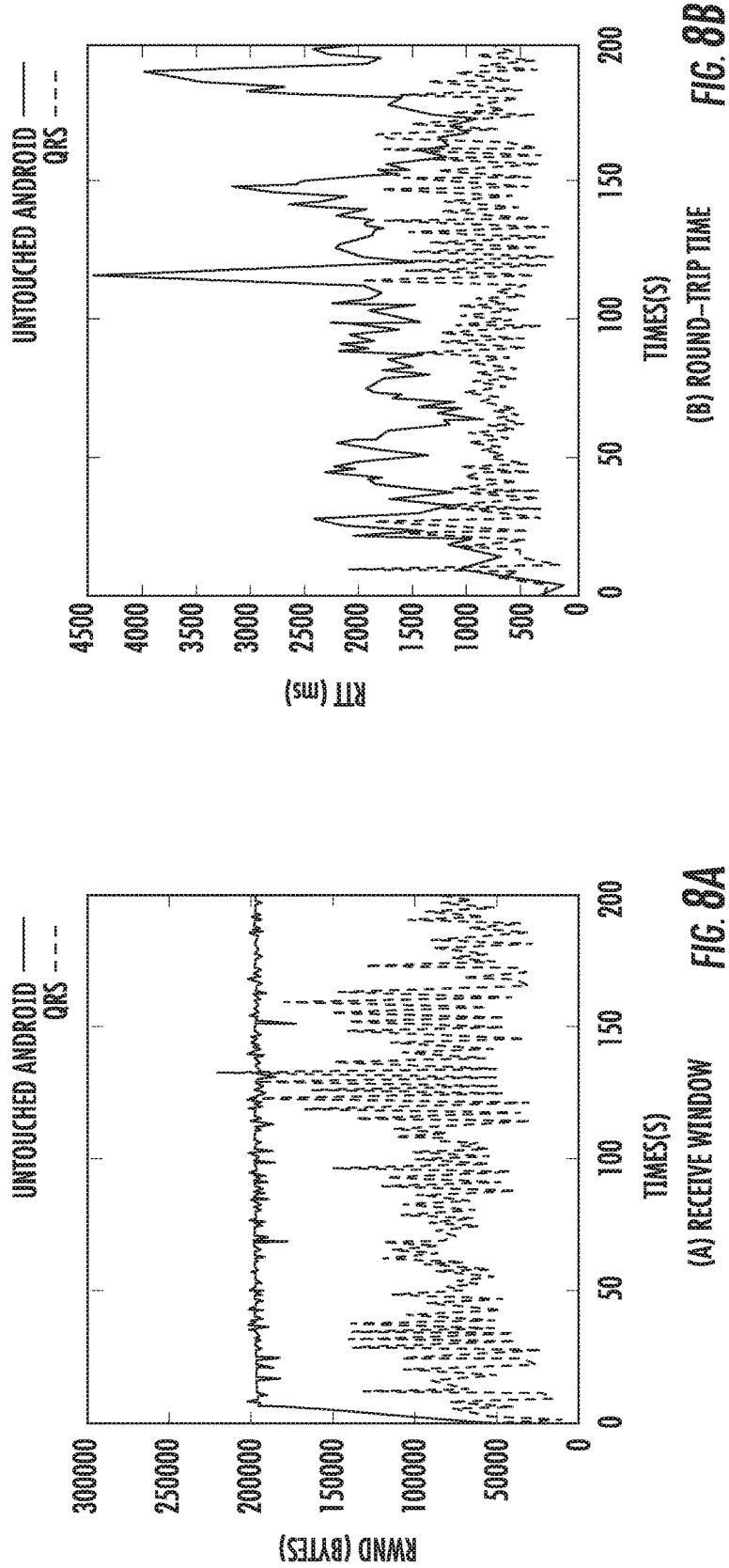

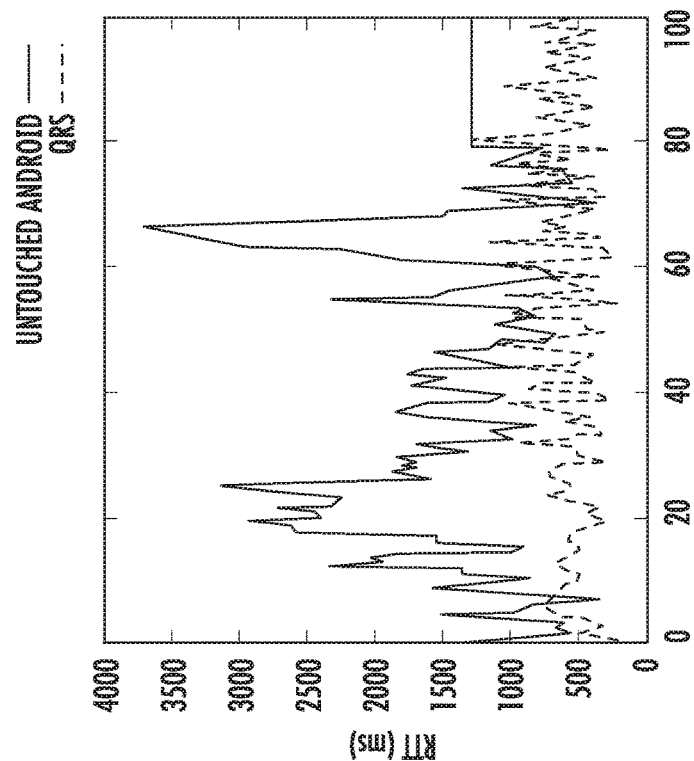
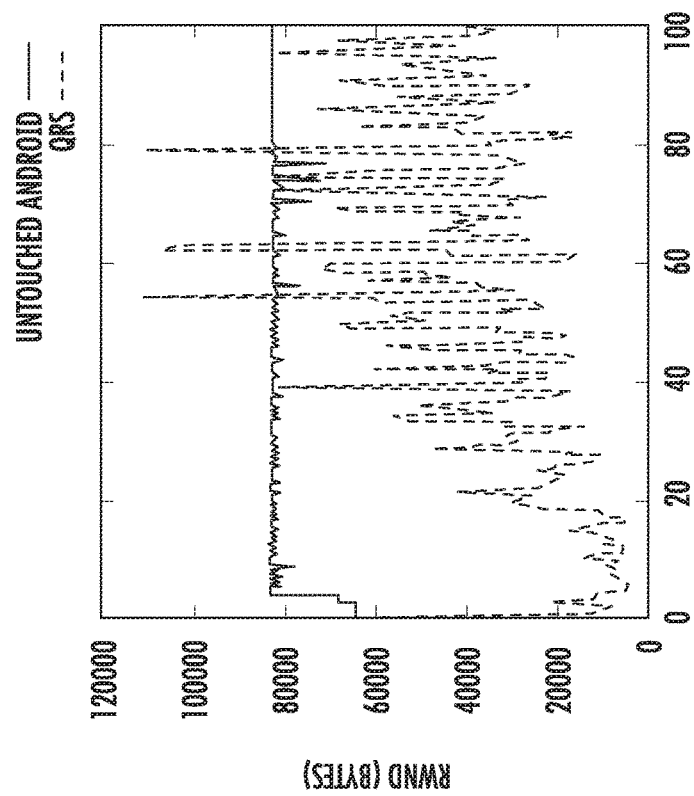
FIG. 9A
FIG. 9B

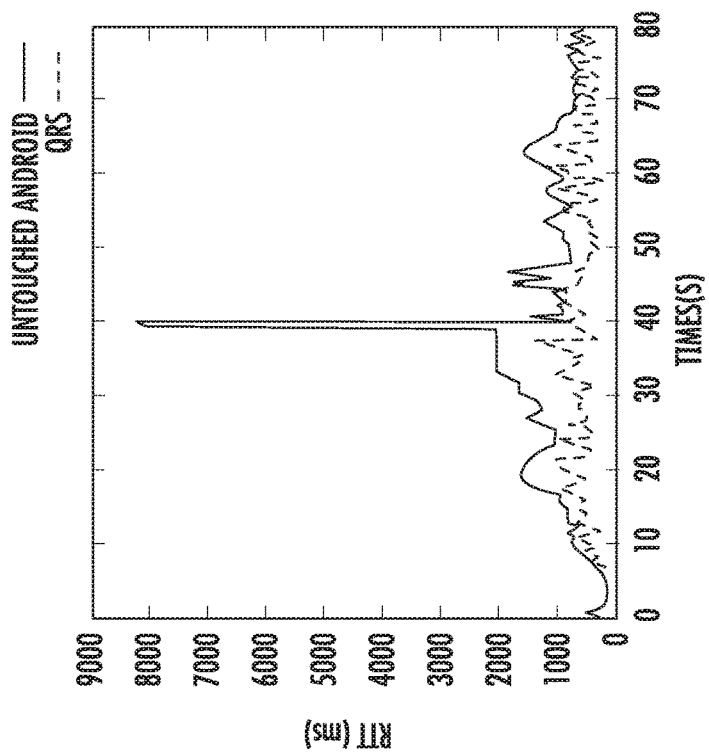
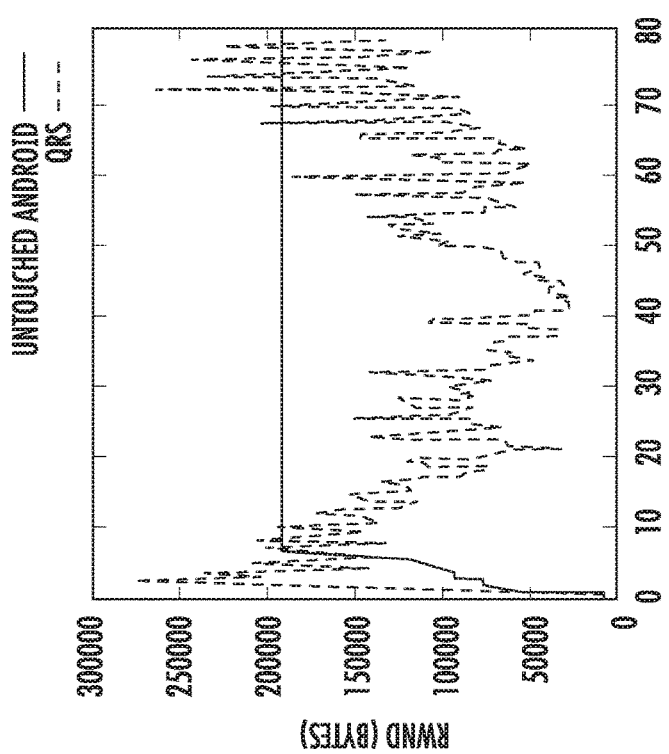

RECEIVER-BASED METHODS, SYSTEMS, AND COMPUTER READABLE MEDIA FOR CONTROLLING TCP SENDER BEHAVIOR IN MOBILE COMMUNICATIONS NETWORKS WITH LARGE BUFFER SIZES

PRIORITY CLAIM

This application is a continuation of U.S. patent application Ser. No. 14/349,552, filed Apr. 3, 2014, which is a national stage application under 35 U.S.C. §371 of International Application No. PCT/US2012/058731, filed Oct. 4, 2012, which claims the benefit of U.S. Provisional Patent Application Ser. No. 61/543,128, filed Oct. 4, 2011, and U.S. Provisional Patent Application Ser. No. 61/648,056 filed May 16, 2012; the disclosures of which are incorporated herein by reference in their entireties.

TECHNICAL FIELD

The subject matter described herein relates to methods and systems for controlling TCP sender behavior in cellular communications networks with large buffer sizes. More particularly, the subject matter described herein relates to

BACKGROUND

TCP is the dominant transport layer protocol of the current Internet, carrying around 90% of the total traffic [15, 10]. Hence, the performance of TCP is of utmost importance to the well-being of the Internet and has direct impacts on user experiences. Although TCP is a well-studied area where a large number of improvements have already been proposed, TCP performance over cellular networks (e.g., 3G or 4G networks) has not been given adequate attention.

With the exponential growth of hand-held devices like smart phones and tablet computers, TCP performance in cellular networks is becoming more and more important. Unfortunately, according to extensive measurements, TCP has a number of performance issues in this new environment, including extremely long delay and sub-optimal throughput. The reasons behind such performance degradations are two-fold. First, most of the widely deployed TCP implementations use loss-based congestion control where the sender will not slow down its sending rate until it sees packet loss. Second, most cellular networks are over-buffered to accommodate the bursty traffic and channel variability [12, 7]. The combination of these two facts leads to the following phenomenon: the TCP sender keeps increasing its sending rate to probe the available bandwidth along the path. Even if it has already reached the bottleneck link capacity, the congestion window will continue to grow since all the overshot packets are absorbed by the buffers and are not lost. This results in a long queue in the cellular base station and up to several seconds of end-to-end delay. This long queuing not only affects the performance of delay-sensitive applications like video streaming (video streaming applications like YouTube use TCP) but also degrades throughput performance of TCP.

To solve this problem, Android phones adopt a simple trick: a static upper limit is set on the maximum receive buffer size. Since the advertised receive window cannot exceed the receive buffer size and the sender cannot send more than what is allowed by the advertised receive window, this limit effectively prevents TCP congestion window from excessive growth (see FIGS. 1A and 1B). However, since the limit is statically configured, it is sub-optimal in certain scenarios and will degrade TCP performance in both throughput and delay.

Accordingly, in light of these difficulties, there exists a need for receiver-based methods, systems, and computer readable media for controlling TCP sender behavior in cellular communications networks with large buffer sizes.

SUMMARY

Receiver-based methods for controlling TCP sender behavior in cellular communications networks with large buffer sizes are disclosed. One method includes, at a TCP receiver, receiving packets from a TCP sender. The method further includes determining, based on the packets, a minimum round trip time and a moving average round trip time for cellular network carrying the packets between the TCP sender and the TCP receiver. The method further includes adaptably adjusting a received window size to advertise to the TCP sender based on the minimum round trip time and the moving average round trip time. The method further includes advertising the adjusted received window sizes to the TCP sender.

As used herein, the term "cellular network" includes network technologies through which mobile communications devices, such as mobile telephones, smart phones, tablet computers, notebook computers, and laptop computers access a network. The term "cellular network" is not limited to any particular generation of network access technologies and is intended to include, but not be limited to, 2G, 3G, 4G, and subsequent generation mobile communications device network access technologies.

The subject matter described herein for controlling TCP sender behavior in cellular communications networks with large buffer sizes may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIGS. 8A and 8B are graphs illustrating a TCP behavior comparison between untouched Android and QRS in AT&T's HSPA network when the phone has a weak signal. QRS effectively puts the RTT under control while untouched Android experiences several seconds of RTT.

FIGS. 9A and 9B are graphs illustrating a TCP behavior comparison between untouched Android and QRS in Sprint's EV-DO network when the phone has a weak signal. QRS effectively puts the RTT under control while untouched Android experiences several seconds of RTT.

FIGS. 10A and 10B are graphs illustrating a TCP behavior comparison between untouched Android and QRS in AT&T's HSPA network when the phone moves from an area with good signal to an area with weak signal and then returns. QRS nicely tracks the variation of the channel condition and has a constantly low RTT.

DETAILED DESCRIPTION

The subject matter described herein includes an adaptive receive window adjustment algorithm referred to herein as Queue-aware Right-Sizing (QRS). QRS runs on the receiver side and continuously monitors the round-trip time (RTT) of the TCP connection and the amount of data received within each RTT. The latter is a rough estimate of the current congestion window (cwnd) at the sender and serves as a basis of a receive window (rwnd) adjustment algorithm. Basically, we set rwnd to $\gamma$*cwnd where $\gamma$ is proportional to the ratio between the minimum RTT and the currently estimated RTT (RTTmin/RTTest). When the current RTT is close to the minimum RTT we have observed so far, we advertise a large window to give the sender enough space to probe the available bandwidth. As RTT increases due to queuing delay, we gradually advertise a smaller window relative to the estimated congestion window to prevent it from excessive growth. Our extensive experiments over two major U.S. carriers (AT&T, which uses HSPA and Sprint, which uses EV-DO) with various Android smart phones from different manufacturers show that, QRS is able to decrease the end-to-end delay of TCP by up to 35.88% and increase its throughput by up to 54.26%!

Our proposal requires modifications only on the receiver side and is fully compatible with existing TCP protocol. This makes QRS easy to deploy. Carriers or device manufacturers can simply issue an update to the hand-held devices' protocol stack so that these devices could immediately enjoy much better performance when interacting with existing servers.

In summary, the subject matter described herein includes:

A description of extensive experiments conducted to diagnose the performance problem of TCP over cellular networks and located the root cause of the problem.

A description of QRS, a solution that is immediately applicable to smart phones and compared its performance with existing approaches in a number of different scenarios.

This document is organized as follows. Section 2 details the problems we have discovered in TCP over cellular networks and analyses its root cause. We elaborate our solution in Section 3 and evaluate its performance in various scenarios in Section 4. The pros and cons of QRS as well as other alternative solutions are discussed in Section 5. Section 6 discusses conclusions.

2 TCP Fails in Cellular Networks

Figure 1A:
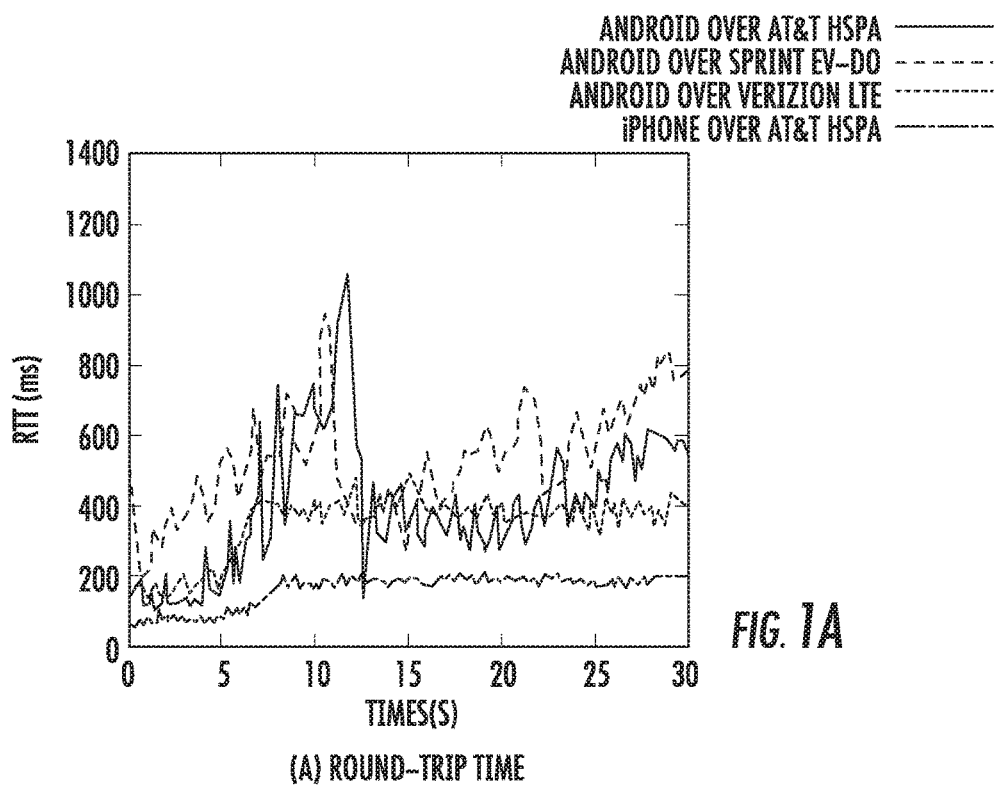
FIGS. 1A and 1B are graphs illustrating abnormal TCP behavior in cellular networks: in this test, the Android phone or iPhone simply downloads a 9 MB file from a Linux server. RTT and congestion window are monitored on the server side via tcp probe [9]. More details on the test environment can be found in Section 4.1.
Figure 1B:
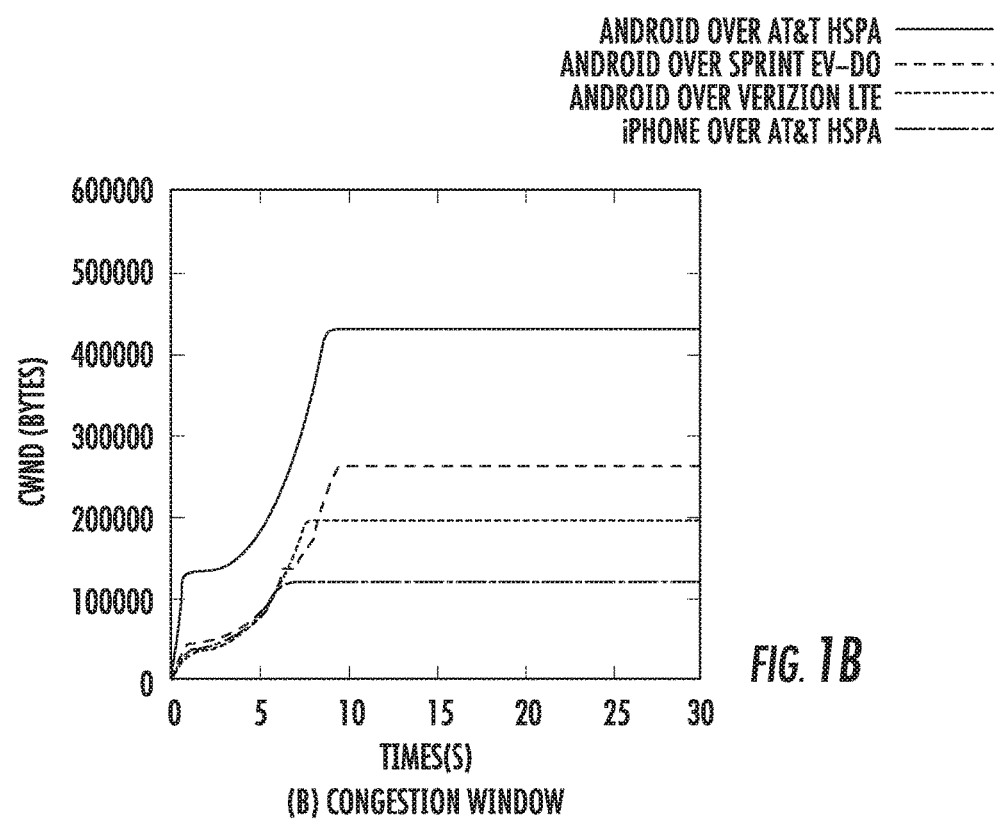

In September 2009, David P. Reed reported on the end-to-end interest mailing list that up to 10 seconds of RTT with low packet loss was observed when he tried to ping an MIT server from Chicago using AT&T's Mercury mobile broadband modem [16]. We conducted a similar experiment with both Android phones and iPhone over AT&T's HSPA network, Sprint's EV-DO network as well as Verizon's LTE network. We recorded the congestion window and RTT of the TCP connection who downloads a 9 MB file from a university server to the smart phone. The results are shown in FIGS. 1A and 1B.

We did not see an extremely long RTT in this experiment but observed a strange pattern in the evolution of the TCP congestion window. As FIG. 1B shows, the familiar saw-tooth behavior of TCP congestion window does not appear. Instead, the congestion window increases to a static size and stays there for a long time. This abnormal phenomenon caught our attention and revealed an untold story of TCP over cellular networks.

TABLE 1

Maximum TCP receive buffer size (Byte) for various networks on different Android phones. Note that these values may vary on customized ROMs and can be looked up by looking for "setprop net.tcp.buffersize.*" in the init.rc file of the Android phone. Also note that different values are set for different carriers even if the network types are the same. We suspect that these values are determined based on each carrier's network conditions.

|  | Samsung Galaxy S II for AT&T | HTC EVO Shift for Sprint |
| --- | --- | --- |
| Wi-Fi | 110208 | 110208 |
| UMTS | 110208 | 393216 |
| EDGE | 35040 | 393216 |
| GPRS | 11680 | 393216 |
| HSPA | 262144 | N/A |
| WiMAX | N/A | 524288 |
| Default | 110208 | 110208 |

Most of the current 3G networks are over-buffered (or buffer-bloated as termed by [7]). These excessive buffers were originally introduced into cellular networks due to a number of reasons. First, the channel status of 3G links fluctuates quickly and the corresponding channel rate varies from dozens of Kbps to several Mbps. Second, the data traffic over such links is highly bursty. To absorb such bursty traffic over such a variable channel, the simple yet effective approach adopted by current 3G networks is to provide large buffers. These buffers smooth the bursty traffic and reduce the packet loss rate in cellular networks. Further, due to the relatively high bit error rate over the wireless channel, link layer retransmission is typically performed in cellular networks, which also requires large buffers in the routers or base stations to store the unacknowledged packets.

Providing large buffers seems to be a viable solution at Layer 2, but it has an undesirable interaction with the TCP congestion control algorithm at Layer 4. TCP relies on packet loss to detect network congestion. Although other variants such as delay-based congestion control exist, most of the widely deployed TCP implementations (e.g., Newreno [5], BIC [18], CUBIC [8]) still use loss-based congestion control [19]. Excessive buffers in cellular networks prevent packet losses from happening even if TCP's sending rate far exceeds the bottleneck link capacity. This "hides" the network congestion from the TCP sender and makes its congestion control algorithm malfunction.

Therefore, what happens in FIG. 1B is that cwnd keeps increasing until it reaches the advertised rwnd and stays there forever. It cannot increase further since data transmission is governed by the minimum of cwnd and rwnd. It will not decrease since no packet is lost. This strange phenomenon completely voids TCP congestion control, which tries to find an appropriate sending rate by probing and back-off. Instead, cwnd at the sender is almost directly determined by the maximum receive buffer size configured on the receiver side. This size is strategically configured on different Android phone models for different networks (Table 1) and is much lower than that of the desktop distributions (e.g., Ubuntu has a maximum receive buffer size of 3514168 bytes by default). As for iPhone, we are not sure about its internal operations. But as the test results show, the iPhone seems to have done something similar. Now the question is: why do they do this? Is it only because smart phones have limited memory?

Figure 2B:
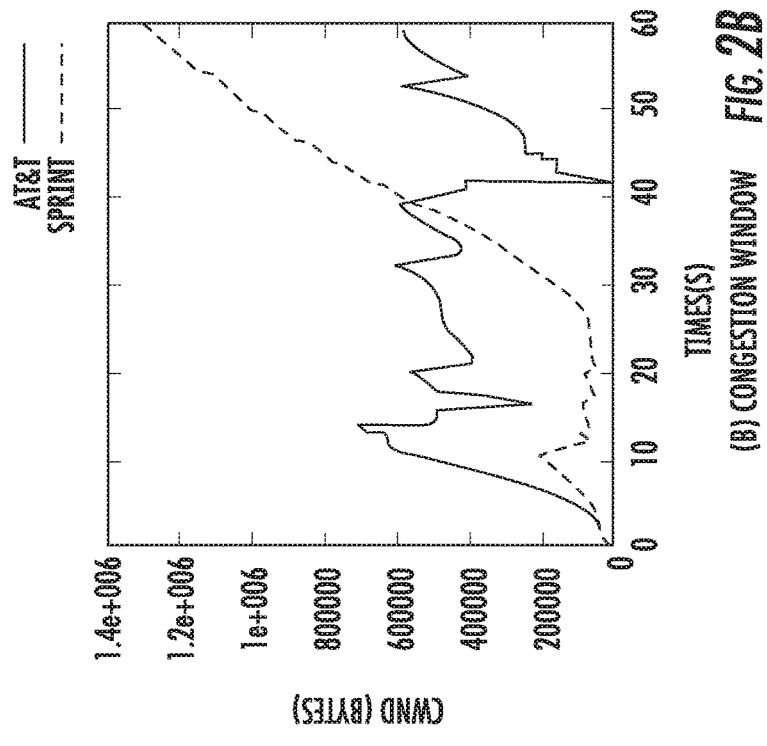
FIGS. 2A and 2B are graphs illustrating TCP behavior in AT&T's HSPA network and Sprint's EV-DO network when we set the maximum receive buffer size of Android phones to a huge value. Without the constraints of the maximum receive buffer, TCP constantly overshoots to a great extent and results in huge queuing delay.
Figure 2A:
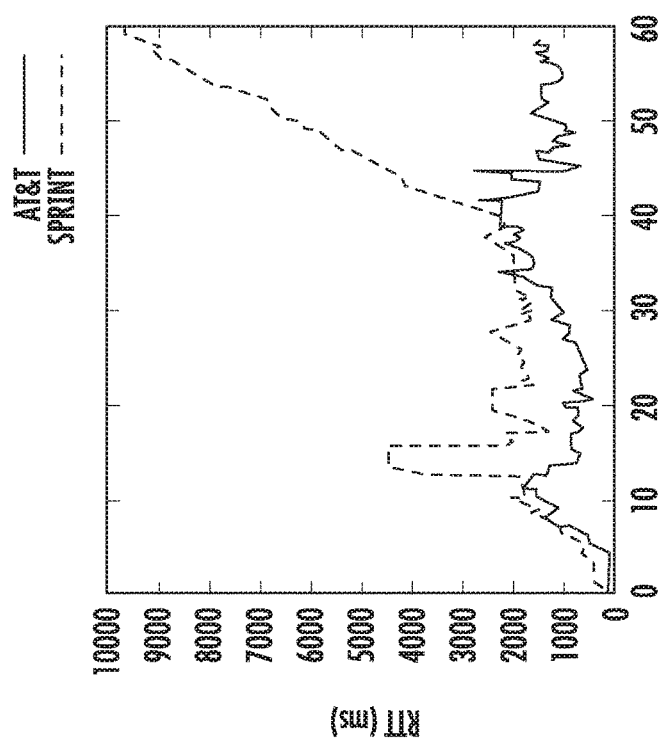

To answer this question, we conducted the same experiment but set the maximum receive buffer size to a very large value that it is almost infinity for any practical purpose. The results are shown in FIGS. 2A and 2B. After removing the upper bound imposed by the maximum receive buffer size, we could see the RTT rise up to nearly 10 seconds in the worst case. This explains why Android sets those values for various networks: due to the excessive buffers in cellular networks, TCP congestion control does not function properly on its own. It constantly overshoots the underlying bandwidth-delay product (BDP) to a great extent. For instance, the peak downlink rate for EV-DO is 3.1 Mbps. If the RTT of the underlying path is 150 ms (that's the minimum RTT we observed in FIG. 2A), the actual BDP is only 58125 bytes. But in FIG. 2B the congestion window in the Sprint network rockets to over 1200000 bytes! The overshot packets are all absorbed by the buffers and no packet gets lost. Hence, TCP sender incessantly increases its congestion window and incurs huge queuing delay.

By comparing FIGS. 1A and 1B and FIGS. 2A and 2B, we can see that the simple scheme adopted by Android does help mitigate the problem. Android prevents TCP sender's congestion window from exorbitant overshooting and controls the RTT within one second. However, since these upper limits are statically configured, they are engineered for the average case and are sub-optimal in other cases. They may be too high for some scenarios and could not prevent TCP window from excessive growth, resulting in long queuing delay. They may also be too low for some other scenarios and degrade TCP throughput. FIGS. 3A and 3B and FIGS. 4A and 4B illustrate these two scenarios.

Figure 3B:
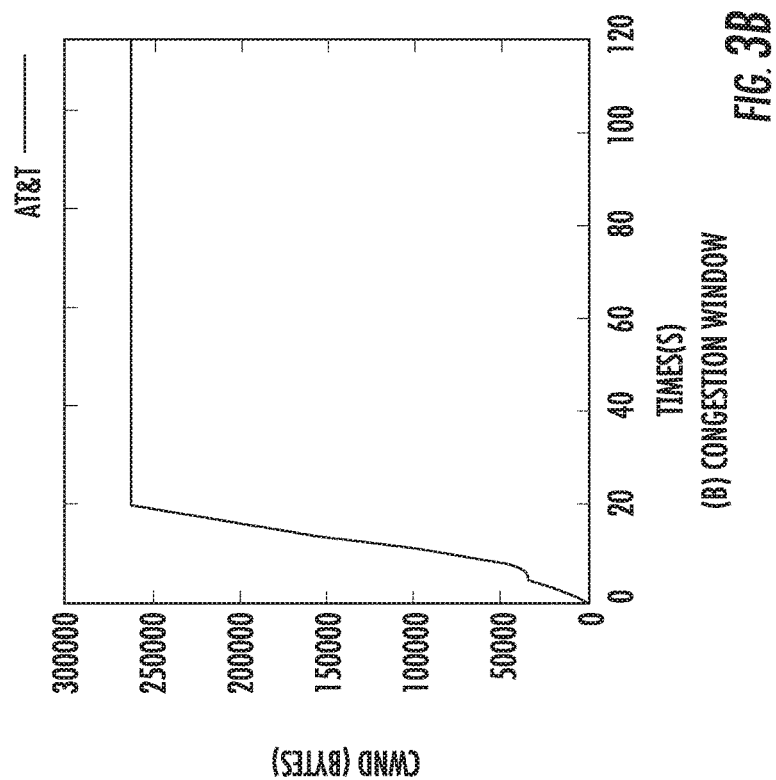
FIGS. 3A and 3B are graphs illustrating TCP behavior in AT&T's HSPA network when the Android phone has a weak signal. In this scenario, despite the maximum receive buffer size is imposed, RTT can still rise up to several seconds.
Figure 3A:
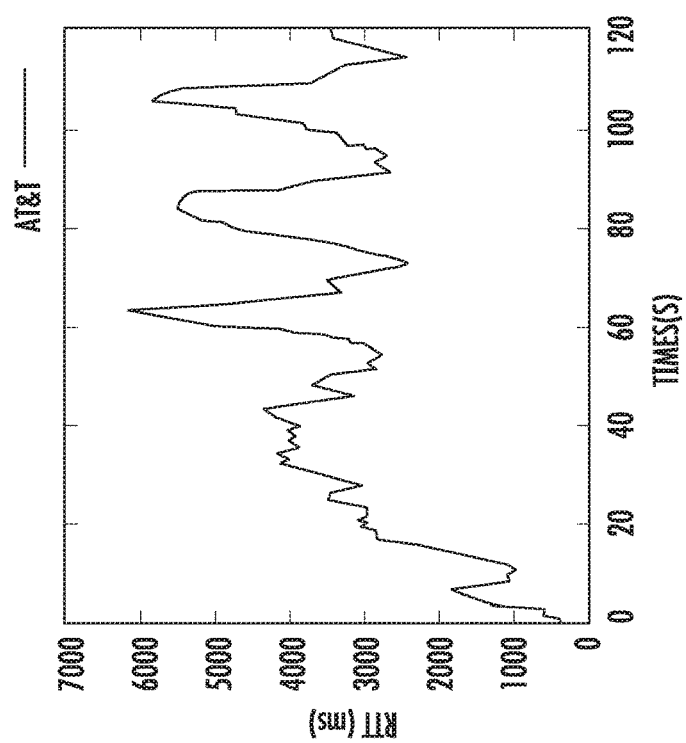

In FIGS. 3A and 3B, we performed the test in an area where the 3G signal is very weak. In such a scenario, the BDP of the underlying network is small and the static limits imposed by Android are too high for it. Therefore, we see the RTT rise up to several seconds. Comparing this with FIGS. 1A and 1B, we observe similar behavior in TCP congestion window but drastically different RTT performance. This clearly demonstrates the limitation of the static approach.

Figures 4A, 4B, 4C:
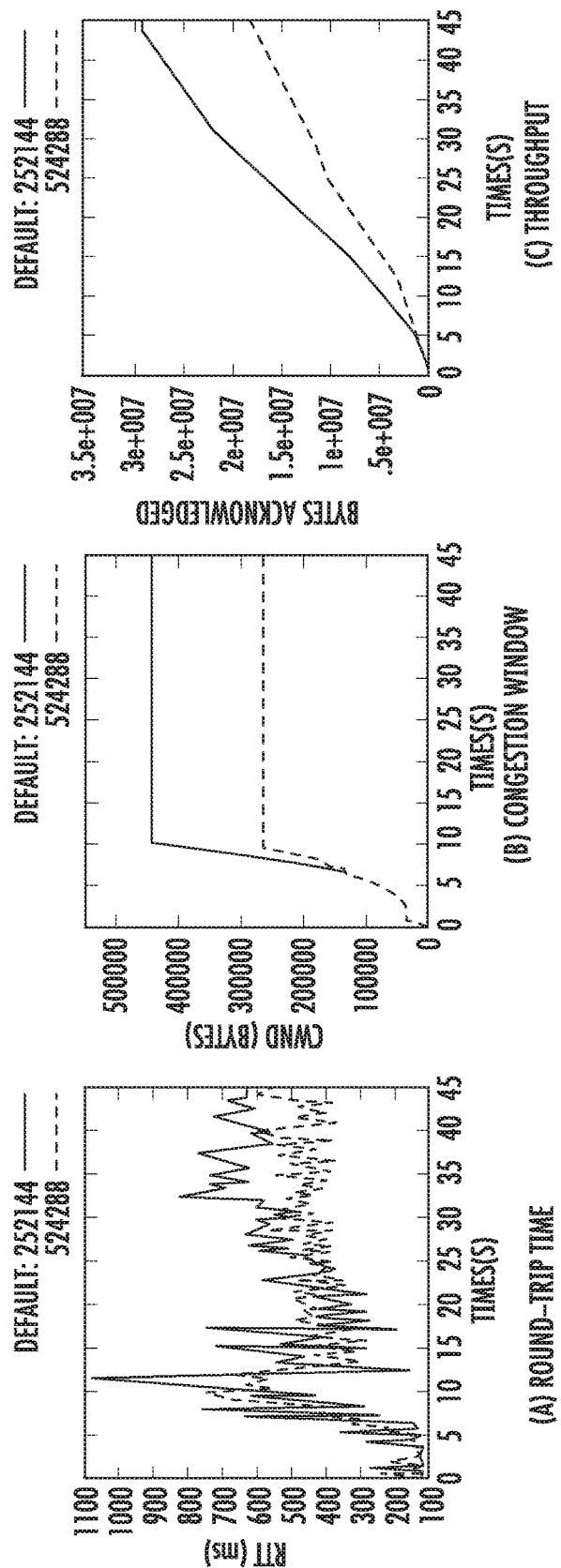
FIGS. 4A-4C are graphs illustrating TCP behavior in AT&T's HSPA network when the Android phone has a good signal. We set the maximum receive buffer size of Android phones to 262144 bytes (Default) and 524288 bytes respectively. The increased limit has improved TCP throughput without introducing extra delay.

FIGS. 4A-4C shows the other scenario where the static limits are too low and degrade TCP performance in terms of throughput. Here we manually increase the static limit imposed by Samsung Galaxy S II for AT&T's HSPA network from 262144 bytes to 524288 bytes and compare their performance in both delay and throughput. As FIG. 4A shows, the two thresholds lead to similar RTT performance, implying that the increased limit does not incur more congestion in the network. However, it does improve TCP throughput. FIG. 4C plots the number of bytes acknowledged by the receiver versus time. Hence, the slope of this curve reflects the throughput of TCP. The steeper the curve, the higher throughput TCP achieves. Obviously, the increased threshold leads to better throughput performance without introducing extra queuing delay. This demonstrates that the static limit set by Android is too low for this scenario and underutilizes the network.

In summary, the simple technique of statically setting an upper limit leads to sub-optimal performance in many scenarios. We need an adaptive receive window adjustment algorithm to advertise a proper window to the sender so that it can fully utilize the available bandwidth while avoiding network congestion. This task originally belongs to the congestion control algorithm of TCP. But due to the buffer-bloat problem, loss-based congestion control is no longer effective in cellular networks. Hence, we propose QRS, a receiver-driven solution that is backward-compatible and incrementally deployable. Alternative solutions such as changing TCP congestion control algorithm on the sender side are discussed in Section 5.

3 Our Solution

Before describing our adaptive receive window adjustment algorithm, let us first take a look at how receive window is determined in the current TCP implementations.

3.1 the Vicious Cycle of Dynamic Right-Sizing in Cellular Networks

TCP receive window was designed to prevent a fast sender from overwhelming a slow receiver. This window reflects the available buffer size on the receiver side so that the sender will not send more packets than the receiver can accommodate. The combination of this flow control and TCP congestion control ensures that neither the receiver nor any intermediate router along the path will be overloaded.

With the advancement in storage technology, memories are becoming cheaper and cheaper. Nowadays, it is not uncommon to find a computer equipped with several gigabytes of memory and even smart phones are now equipped with 1 GB of RAM (e.g. Motorola Droid Bionic, Samsung Galaxy S II). Hence, buffer size on the receiver side is hardly the bottleneck in the current Internet. To maximize TCP throughput, a receive buffer auto-tuning technique called Dynamic Right-Sizing (DRS [4]) was proposed. In DRS, instead of determining the receive window based on the available buffer size, we dynamically resize the receive buffer so as to suit the connection's demand. The fundamental goal of DRS is to allocate enough buffer (as long as we can afford it) so that the throughput of the TCP connection is never limited by the receive window size but only constrained by network congestion.

Algorithm 1 below gives the details of DRS. In DRS, we first measure the RTT of the TCP connection at the receiver. Strictly speaking, RTT is the time between when data is sent and the corresponding acknowledgement is received. However, since the receiver typically has no data to send, it is hard to measure RTT on the receiver side. DRS exploits a particular definition of RTT which is the time between when a byte is first acknowledged and the receipt of data that is at least one window beyond the sequence number that was acknowledged. Although there is some deviation, this RTT measurement is proved to be good enough for the purpose.

---
Algorithm 1 DRS
---

Initialization:
rwnd <- 0;
RTT Estimation:
$RTT_{est}$ <- the time between when a byte is first acknowledged and the receipt of data that is at least one window beyond the sequence number that was acknowledged;
Dynamic Right-Sizing:
if data is copied to user space then
if elapsed_time < $RTT_{est}$ then
    return;
end if
    $cwnd_{est}$ <- data_rcvd;
    rwnd <- max{2* $cwnd_{est}$,rwnd};
    rwnd <- min{tcp_rmem_max,rwnd};
    Advertise rwnd as the receive window size;
    end if

---

Once the RTT is known, the current congestion window of the sender can be trivially estimated on the receiver side by counting the amount of data received within one RTT. Since TCP congestion window can at most double within an RTT (e.g., during slow start), DRS set the advertised receive window to be twice of the estimated congestion window so that the TCP sender is always congestion-window-limited rather than receive-window-limited. Further, since the TCP sender may be application-limited and have not fully used the congestion window, the data received in an RTT may be smaller than the actual window size. DRS therefore uses the largest estimated congestion window seen during any RTT. Note that this makes adjustment of the receive window in DRS non-decreasing. It is acceptable because the sole goal of DRS is to set the congestion window "free" from the constraints of the receive window. It does not matter if the advertised receive window is too large. Finally, the receive window is of course bound by the maximum receive buffer size.

Linux adopted a receive buffer auto-tuning scheme similar to DRS since kernel 2.4.27. Other major operating systems also implemented certain kind of TCP buffer auto-tuning (Windows since Vista, Mac OS X since 10.5, FreeBSD since 7.0). This implies a significant role change of TCP receive window. Although the functionality of flow control is still preserved, most of the time the receive window is set to a value that lets TCP congestion control fully explore the available bandwidth while preventing the receiver from allocating unnecessarily large buffers to a connection.

Although DRS works fairly well in traditional networks and improves TCP throughput to a great extent, it actually incurs a vicious cycle in cellular networks. When the congestion window of the TCP sender increases, more packets are clocked out within an RTT and are queued in the buffer. This leads to longer queuing delay and longer RTT measured by the receiver which increases its estimation of the sender's congestion window. Since DRS requires the receive window to keep in pace with the growth of the congestion window, the advertised window will be increased, leaving more space for the congestion window to grow. This ever increasing trend will stop only if the bloated buffers are filled up so that packets start to get lost or the advertised receive window reaches the maximum receive buffer size. The current solution adopted by many vendors to break this vicious cycle, as shown in Section 2, is to set a relatively small maximum receive buffer size. This simple fix has been shown to be sub-optimal; hence we propose QRS to refine the window adjustment algorithm of DRS.

3.2 Queue-Aware Right-Sizing

QRS is built on top of DRS. Instead of a unidirectional adjustment where the advertised window is non-decreasing, we need a bidirectional adjustment algorithm to rein TCP in the buffer-bloated cellular networks but at the same time ensure full utilization of the link. To accomplish that, QRS needs to keep the queue size small but non-empty. That is why we call our scheme "queue-aware" right-sizing. Algorithm 2 below gives details of QRS.

---
Algorithm 2 QRS
---

Initialization:

$RTT_{min}$ <- ∞;
$cwnd_{est}$ <- data_rcvd in the first $RTT_{est}$;
rwnd <- 0;
Minimum RTT Estimation:

if TCP timestamp option is available then
    $RTT_{est}$ <- averaging the RTTs calculated from the timestamps;
else
    $RTT_{est}$ <- the time between when a byte is first acknowledged and the receipt of data that is at least one window beyond the sequence number that was acknowledged;
end if
if $RTT_{est}$ < $RTT_{min}$ then
    $RTT_{min}$ <- $RTT_{est}$;

-continued

Algorithm 2 QRS end if
Queue-aware Right-Sizing:

if data is copied to user space then
   if elapsed_time < $RTT_{est}$ then
return;
   end if
   $cwnd_{est} \leftarrow \alpha * cwnd_{est} + (1 - \alpha) * data\_rcvd$;

$$rwnd \leftarrow \lambda * \frac{RTTmin}{RTTest} * cwnd_{est};$$

rwnd ← min{tcp_rmem_max,rwnd};
   Advertise rwnd as the receive window size;
end if QRS uses almost the same technique as DRS to measure RTT on the receiver side. One difference is that, if the TCP timestamp option is available in the packets, we use that to obtain a more accurate estimation of RTT. In addition to RTT measurement, QRS also records the minimum RTT ever seen in this connection and use it later to determine the receive window size. Since the minimum RTT approximates the round-trip propagation delay between the two hosts when no queue is built up in the intermediate routers, we use it as a criterion to determine whether the network is congested.

After knowing the RTT, QRS counts the amount of data received within one RTT in the same way as DRS. However, QRS further smoothes the estimated congestion window by applying a low-pass filter ($\alpha$ is set to ⅞ in our current implementation). This smoothed value is used to determine the receive window we advertise. In contrast to DRS, which always sets rwnd to $2*cwnd_{est}$, QRS sets rwnd to $$\lambda * \frac{RTTmin}{RTTest} * cwnd_{est}.$$

When $RTT_{est}$ is close to $RTT_{min}$, implying the network is not congested, rwnd will be set to a large value to give the sender enough space to probe the available bandwidth. As $RTT_{est}$ increases, we gradually decrease rwnd to stop TCP from overshooting. The operation of taking the maximum of the newly calculated rwnd and the previous rwnd in DRS is also removed so that QRS makes bidirectional adjustment of the advertised window. RTTest is continually calculated, and thus constitutes a moving average RTT that is used to continually adjust receive window size.

This algorithm is simple yet effective. Its ideas stem from delay-based TCP congestion control but work better than delay based TCP congestion control due to some unique characteristics of cellular networks. In wired networks, a router may handle hundreds of TCP flows at the same time, and the flows may share the same output buffer. That makes RTT measurement more noisy and delay-based congestion control less reliable. However, in cellular networks, a base station typically has separate buffer space for each user and a mobile user is unlikely to have many simultaneous TCP connections. This makes RTT measurement a more reliable signal for network congestion.

In QRS, $\lambda$ tunes the aggressiveness of the algorithm and demonstrates the trade-off between throughput and delay. Note that when $RTT_{est}/RTT_{min}$ equals to $\lambda$, the advertised receive window will be equal to the estimated congestion window, leading to a steady state. Therefore, $\lambda$ reflects the target RTT of QRS. If we set $\lambda$ to 1, that means we want RTT to be around $RTT_{min}$ so that almost no queue is built up. This ideal case only works if 1) the traffic has constant bit rate, 2) the available bandwidth is also constant and 3) the constant bit rate equals to the constant bandwidth. In practice, Internet traffic is bursty and the channel condition varies over time. Both necessitate the existence of some buffers to absorb the temporarily excessive traffic and drain the queue later on when the load becomes lighter or the channel conditions are better. Otherwise, we cannot fully utilize the link. This $\lambda$ determines how aggressive we want to be to keep the link busy and how much delay penalty we can tolerate. The larger the value of $\lambda$, the more aggressive the algorithm. That may increase the throughput of TCP but at the same time introduce extra delay. In our current implementation, we empirically set $\lambda$ to 4 based on our experiences with current cellular networks. A better approach may be to make this parameter adaptive or set a different $\lambda$ for different networks run by different carriers (just like how Android set the maximum receive buffer size).

3.3 Benefits Brought by QRS

QRS is an adaptive receive window adjustment algorithm. Compared to the naive approach adopted by Android phones where a static limit is imposed, QRS brings the following benefits.

QRS increases TCP throughput when the link condition is good. In this case, the static limit is too low and degrades TCP performance in terms of throughput. QRS will instead adaptively adjust the receive window size to let TCP fully utilize the link capacity.

QRS decreases the latency when the link condition is bad. Here the static limit is too high and TCP congestion window will excessively grow to that limit. This puts too many packets in the pipe and introduces extra queuing delay. QRS will rein TCP in this case and reduce its RTT.

When the link condition is fluctuating between good and bad, both throughput and RTT gains can be obtained. In most practical scenarios, we can expect both gains because this case commonly happens in cellular networks.

We will validate these benefits via extensive experiments in the following section.

4 Performance Evaluation 4.1 Test Environment

We implemented QRS in Android phones by patching their kernels. It turns out to be fairly simple to implement QRS in the Linux kernel. It takes merely around 100 lines of code. We downloaded the original kernel source codes of different Android models from their manufacturers' websites. Then we patched them with our QRS algorithm and rebuilt the kernels. Finally, the phones were flashed with the customized kernel images. Of course, the previously pre-set values of the maximum receive buffer size need to be increased to allow QRS enough room for adjustment.

Figure 5:
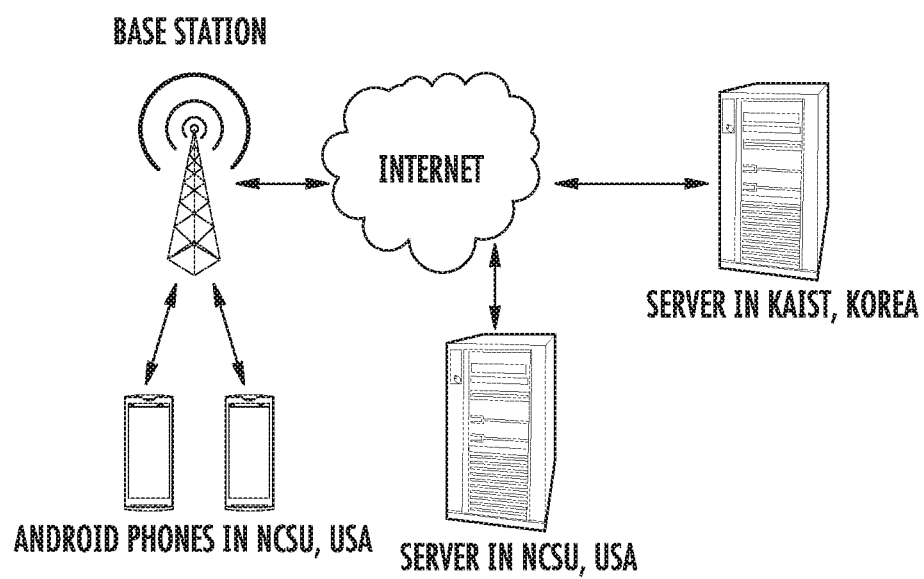
FIG. 5 is a network diagram illustrating an exemplary test environment for the subject matter described herein.

We did head-to-head comparisons between the untouched Android phone and the same model with our customized image. FIG. 5 gives an overview of our test environment. We have two servers from which the Android phones download files: one at North Carolina State University in the United States and one at KAIST in Korea. Since all the smart phones were located at NCSU, we evaluate both scenarios where files are downloaded from a nearby server or a remote server. The servers run Ubuntu 10.04 (kernel version: 2.6.35.13) and use CUBIC [8] as the TCP congestion control algorithm. We developed an Android application that downloads files from the designated servers and ran it on the phone side. Traffic traces were collected on the server side using tcpdump [1] and analyzed using tcptrace [14]. Internal states of TCP (such as cwnd) are probed with the help of the Web100 project [13].

We ran extensive tests in various network scenarios with different carriers, time frames, signal strengths and so on. Table 2 sums them up. For AT&T's HSPA network, we used Samsung Galaxy S II (Android version: 2.3.4). For Sprint's EV-DO network, HTC EVO Shift (Android version: 2.2) was used. All tests have been repeated for at least 50 times and 95% confidence intervals are calculated wherever applicable.

TABLE 2

List of scenarios we have tested: note that good signal strength means between −80 dBm and −85 dBm while weak signal strength means between −100 dBm and −105 dBm. Also note that daytime includes the evening since the traffic load is still high at that time. We contrast this with midnight when the traffic load is very low.

|  | Carrier | Time | Signal | Mobility | Server | Throughput | RTT |
|---|---|---|---|---|---|---|---|
| Scenario 1 | AT&T | Daytime | Good | Stationary | NCSU | +54.26% | −24.03% |
| Scenario 2 | AT&T | Daytime | Weak | Stationary | NCSU | +52.14% | −35.88% |
| Scenario 3 | AT&T | Midnight | Good | Stationary | NCSU | +17.49% | −1.58% |
| Scenario 4 | AT&T | Whole Day | Good | Stationary | NCSU | +23.07% | −20.79% |
| Scenario 5 | AT&T | Daytime | Varying | Mobile | NCSU | +21.49% | −11.08% |
| Scenario 6 | AT&T | Daytime | Good | Stationary | KAIST | +13.82% | −19.46% |
| Scenario 7 | Sprint | Daytime | Good | Stationary | NCSU | +4.70% | −2.69% |
| Scenario 8 | Sprint | Daytime | Weak | Stationary | NCSU | +10.10% | −19.26% |
| Scenario 9 | Sprint | Midnight | Good | Stationary | NCSU | +% | −% |

4.2 Macroscopic Performance

Figure 6B:
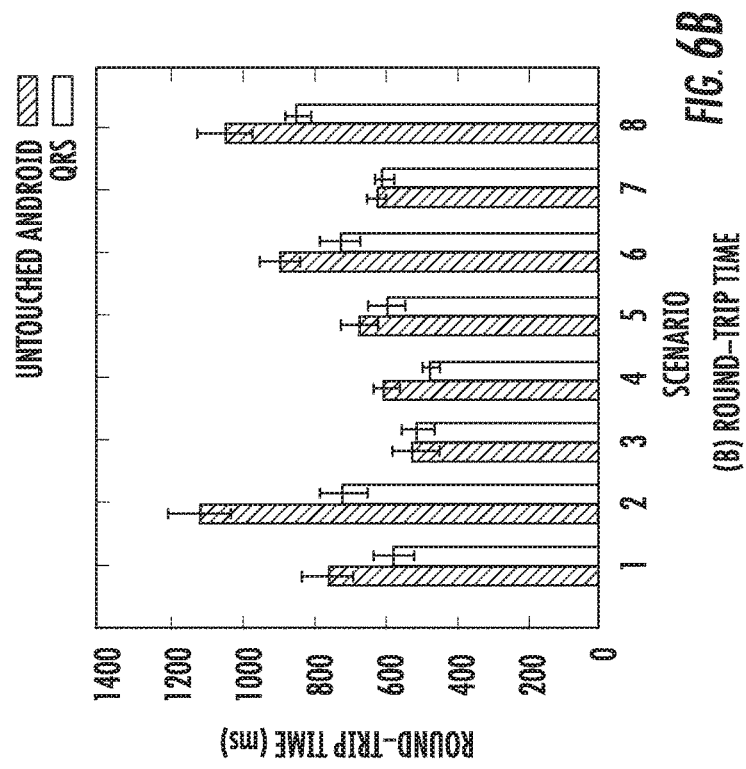
FIGS. 6A and 6B are graphs illustrating average throughput and RTT comparison between untouched Android and queue aware right sizing (QRS) in various scenarios. The bars are the 95% confidence intervals. QRS increases TCP throughput while decreasing its RTT across all scenarios we have tested.
Figure 6A:
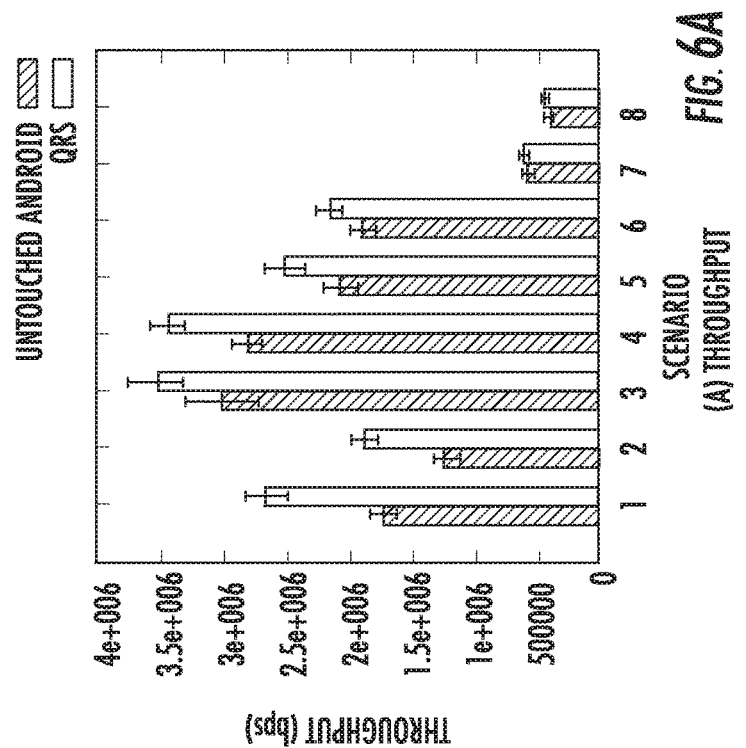

FIGS. 6A and 6B show the average RTT and throughput comparison between untouched Android phones and Android phones equipped with our customized image that runs QRS. Detailed numbers of the performance improvements can be found in Table 2. From these testing results we can see that QRS increases the average TCP throughput while decreasing the average RTT across all scenarios we have tested. Among these scenarios, Scenario 1 shows the most throughput improvement (54.26%) while Scenario 2 shows the most RTT reduction (35.88%). This completely agrees with our prediction in Section 3.3 that QRS increases TCP throughput under good signal condition and decreases latency under weak signal condition.

Note that the average throughput in Sprint's 3G network is much lower than that of AT&T. That's because AT&T uses HSPA technology whose peak downlink rate is 14 Mbps while Sprint uses EV-DO technology whose peak downlink data rate is only 3.1 Mbps. QRS can barely increase TCP throughput in EV-DO network even under good signal strength since there is little room for improvement. But it significantly decreases the RTT in EV-DO networks when the signal strength is weak.

Figure 11A:
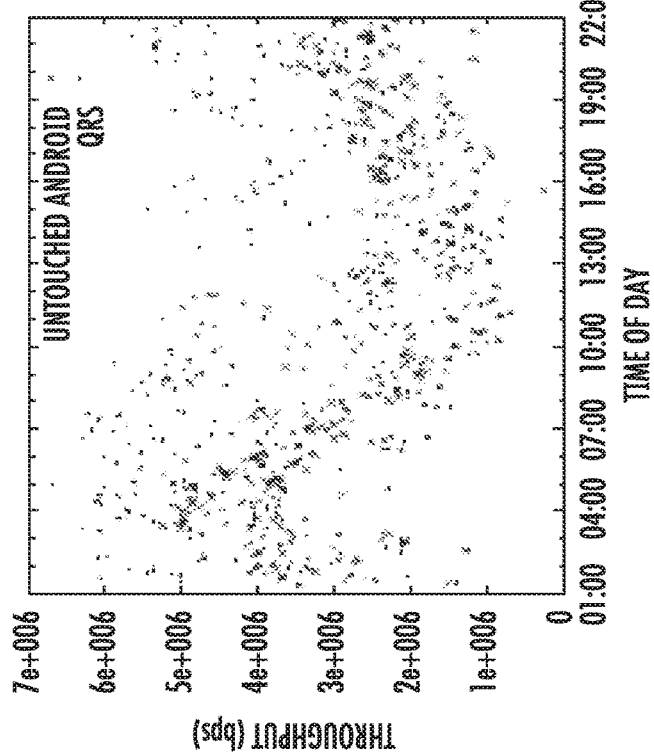
FIGS. 11A and 11B are graphs illustrating RTT and throughput fluctuation between 1 AM and 10 PM in AT&T's HSPA network.

Another thing to note is that, in Scenario 3, QRS shows almost the same RTT as untouched Android. That's because Scenario 3 was carried out at midnight where there's little traffic. The static upper limit imposed by Android is too low in this case and does not cause too much queuing delay. This is confirmed by our whole day test in Scenario 4. FIG. 11A shows that QRS helps reduce RTT during daytime but performs similarly to untouched Android during midnight.

4.3 Microscopic Analysis

In addition to the macroscopic analysis of TCP performance in terms of average throughput and RTT, we also pick a few typical cases and analyze their detailed operations such as cwnd and rwnd evolution.

4.3.1 Good Signal Case Study

Figure 7A:
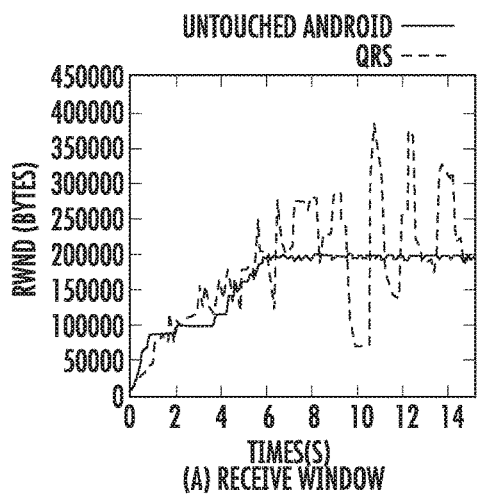
FIGS. 7A-7D are graphs illustrating TCP behavior comparison between untouched Android and QRS in AT&T's HSPA network when the phone has a good signal. QRS will probe above the static limit and give more space to the sender. Hence, QRS achieves higher throughput.
Figure 7B:
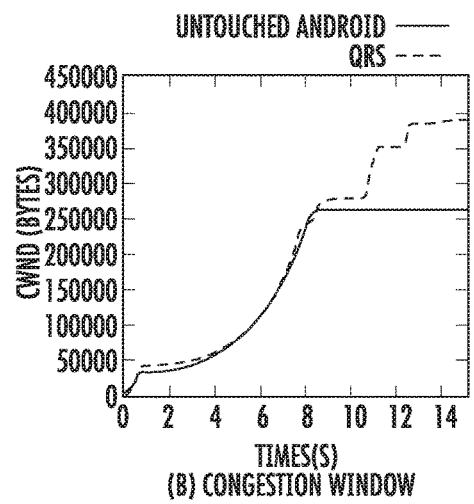
Figure 7C:
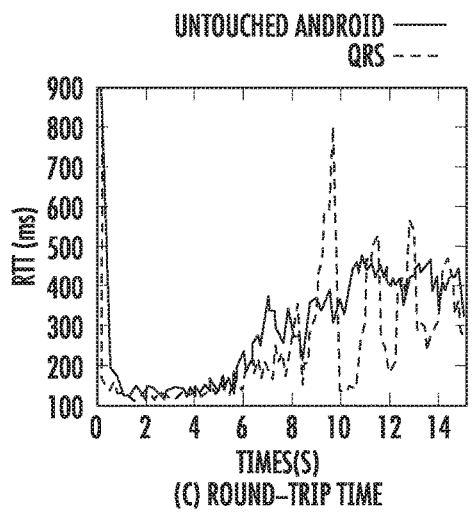

FIGS. 7A-7D show the evolution of receive window, congestion window, RTT and number of bytes acknowledged over time when the phone has good signal condition. In this case, the static limit on the untouched Android phone stops TCP congestion window from further growth and degrades throughput performance. Instead, QRS is able to give the sender more space to probe and hence achieves higher throughput. RTT of the TCP connection is always kept below 1 second in this scenario (FIG. 7C).

Figure 7D:
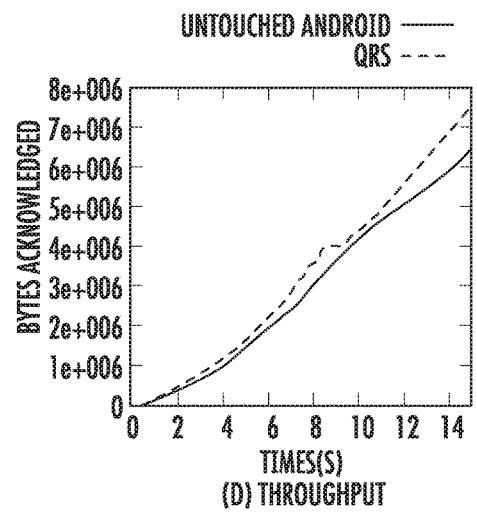

If we take a closer look at FIG. 7A and FIG. 7D, we can see that QRS and untouched Android phones advertise similar receive window sizes before 6 s and hence have similar throughput performance (Note that in FIG. 7D the derivative of the curve at a point reflects the instantaneous throughput at that time). After that, the untouched Android phone reaches the static limit and advertises a constant window size, leading to an almost constant throughput (its curve in FIG. 7D is nearly straight). On the other hand, QRS probes above that static limit after 6 s and achieves higher throughput (steeper line than untouched Android between 6 s and 8 s). Note that QRS may overshoot a bit during the probing phase. However, QRS quickly corrects itself and slows down between 8.5 s and 9.5 s (flatter line in FIG. 7D). After that it starts to probe again and achieves a higher average throughput than untouched Android. This case study clearly demonstrates the effectiveness of the window adjustment algorithm in QRS. The higher throughput is not gained by aggressive transmission. Instead, it acts exactly like what TCP congestion control should have done. In certain sense, the receive window in QRS plays the role of bandwidth probing in place of the congestion window when the latter loses its functionality due to the bloated buffers in cellular networks.

4.3.2 Weak Signal Case Study

FIGS. 8A-8B and FIGS. 9A-9B show the weak signal scenario in AT&T and Sprint networks respectively. In both cases, QRS advertises smaller receive windows than the static limit. The effect is obvious: we see a much lower RTT than untouched Android phones. When their RTTs rise up to several seconds, QRS constantly keeps the RTT below 1 second. If we take a more detailed look into FIGS. 8A-8B and 9A-9B, we can see that QRS manages to keep the RTT to be around 500 ms, which is about four times of the minimum RTT (116 ms in AT&T and 120 ms in Sprint). This is exactly the target value of our algorithm ($\lambda$ is set to 4 in the current implementation).

4.33 Transition Case Study

To evaluate whether QRS is able to track the variability of channel conditions, we ran a mobile test case where we move the Android phone from a good signal area to a weak signal area and then return back to the good signal area. FIGS. 10A-10B show the evolution of the receive window and the RTT over this period. As FIG. 10A shows, QRS effectively traces the fluctuation of the signal condition and adjusts the receive window accordingly, leading to a steadily low RTT. On the other hand, the static limit imposed by Android results in an ever increasing RTT as the signal strength decreases and an RTT hike when it is weakest at around 40 s.

4.3.4 Performance Fluctuation within a Day

Figure 11B:
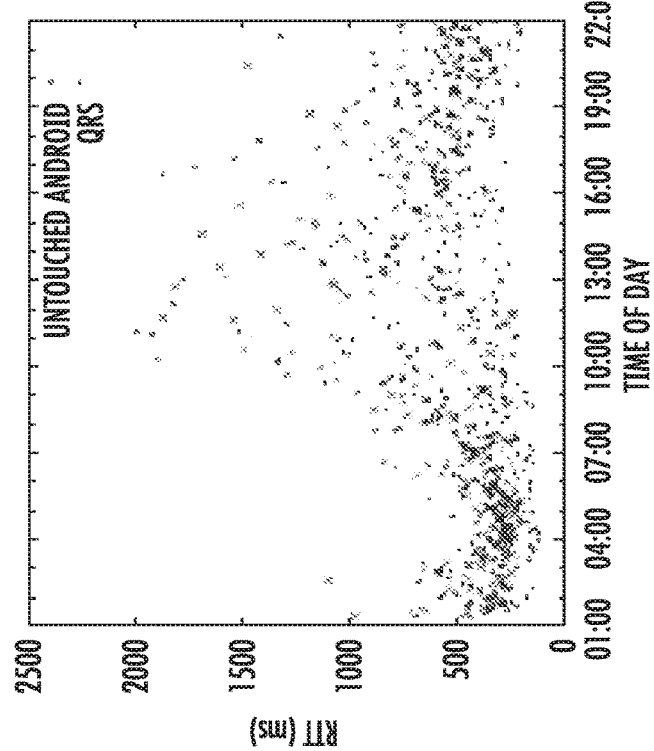

FIGS. 11A-11B show the detail of Scenario 4. In this scenario, we run consecutive tests (with 2-minute interval) for 21 hours (from 1 AM till 10 PM) within one day and observe the performance fluctuation. As the figure shows, during midnight QRS has similar RTT performance to untouched Android phones since the network is not congested. However, during daytime QRS drastically reduces the end-to-end latency of TCP.

On the throughput side, one obvious trend is that the average throughput during midnight is higher than that of daytime. This is intuitive. But despite the time of day, QRS always shows higher average throughput than untouched Android.

5 Discussion 5.1 Fairness Concerns

Traditionally, fairness is a major concern in TCP design since the congestion control algorithms directly determines how bandwidth are shared at the bottleneck link. In cellular networks, base stations typically adopt certain opportunistic scheduling algorithms (e.g. Proportional Fair scheduler) to improve overall system throughput under some fairness constraints [11]. The existence of such schedulers alleviates TCP's responsibility on ensuring fairness among competing flows and gives more freedom to the design of TCP. Since the last-hop cellular network is the most likely bottleneck of the path and the opportunistic schedulers at the base stations impose certain degree of fairness, we believe QRS will not incur serious fairness issues in the Internet.

5.2 Alternative Solutions

To solve TCP's performance problem in buffer-bloated cellular networks, there are many other possible solutions than adjusting the receive window.

One possible solution is to reduce the buffer size in cellular networks so that TCP can function the same way as it does in wired networks. However, as explained in Section 2, these extra buffers are essential to the performance of cellular networks and cannot be easily removed. An alternative to this solution is to employ certain Active Queue Management (AQM) schemes like RED [6] or REM [2]. By randomly drop or mark certain packets before the buffer is full, we can notify TCP sender in advance and avoid the excessively long delay. However, despite being studied extensively in the literature, few AQM schemes are actually deployed in the Internet due to the complexity of their parameter tuning and the limited performance gains provided by them.

Another possible solution to this problem is the modification of the TCP congestion control algorithm at the sender. Instead of a loss-based approach, delay-based congestion control such as TCP Vegas [3] or FAST TCP [17] can be used in this case. However, delay-based congestion control algorithms have their own drawbacks, including the noise in RTT measurement and TCP-friendliness issues. Further, adopting delay-based congestion control requires modifications on the sender sides which are typically large-scale servers. And modifying the TCP stack on the servers will impact all the clients no matter they are on a wired network or a cellular network. QRS requires modifications only on the receiver side (i.e., the mobile devices). The servers need absolutely no modification. Mobile devices can update their protocol stack to enhance their own TCP performance without affecting other wired users. It is a light-weight yet effective solution to the problem.

6 Conclusion

As described herein, we thoroughly investigated TCP's behavior and performance over cellular networks. We reveal that the excessive buffers available in existing 3G networks void the loss-based congestion control algorithm used by most TCP implementations and the naive solution adopted by Android is sub-optimal. Built on top of our observations, an adaptive receive window adjustment algorithm is proposed. This solution requires modifications only on the receiver side and is backward-compatible as well as incrementally deployable. We ran extensive experiments over two major U.S. carriers to evaluate the performance of our proposal and compared it with other existing solutions. Experiment results show that our scheme is able to reduce the average RTT of TCP by up to 35.88% and enhance the average throughput by up to 54.26%.

As for the future work, we plan to further refine our algorithm and evaluate it in broader scenarios. We realize that the cellular networks operated by different carriers in different countries may have completely different characteristics. Our current algorithm is not parameter-free and may require specialized parameter tuning for different networks. Our ultimate goal is to make the algorithm self-tuning and universally applicable.

Finally, as pointed out by [7], the bufferbloat problem is becoming more and more prevalent in the Internet. It is not necessarily specific to cellular networks. The problem we discover in cellular networks (that the excessive buffers void TCP congestion control) may also happen in other networks and requires adequate attention from the research community since TCP is the transport protocol for millions of Internet applications.

Exemplary Implementations

Figure 12:
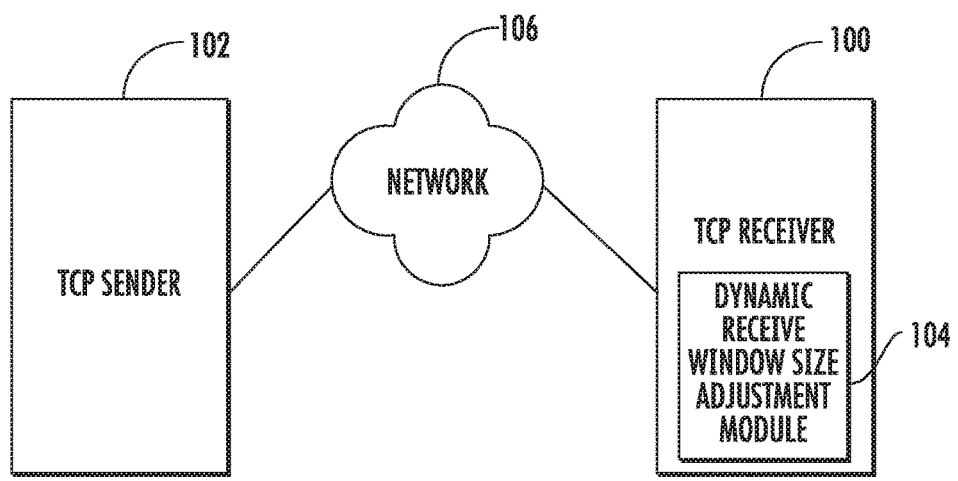
FIG. 12 is a block diagram illustrating a system for use at a TCP receiver for controlling TCP sender behavior in cellular communications networks with large buffer sizes according to an embodiment of the subject matter described herein.

FIG. 12 is a block diagram illustrating an exemplary system for controlling TCP sender behavior in cellular communications networks with large buffer sizes according to an embodiment of the subject matter described herein. Referring to FIG. 12, the system includes a TCP receiver 100 for receiving packets from a TCP sender 102. Receiver 100 includes a dynamic receive window size adjustment module 104 for continually determining, based on the packets, a minimum round trip time and a moving average round trip time for a cellular network 106 carrying packets between TCP sender 102 and TCP receiver 100. Dynamic receive window size adjustment module 104 adaptively adjusts a receive window size to advertise to the sender based on the minimum round trip time and the moving average round trip time. Dynamic receive window size adjustment module 104 advertises the adjusted receive window size to sender 102. TCP receiver 100 may be implemented on any device that communicates in a cellular network using TCP. Exemplary devices include mobile telephones, tablet computers, laptop computers, or other computers that communicate over cellular networks. TCP sender 102 may be any device in a cellular network that sends packets to a TCP receiver. For example, TCP sender 102 may be implemented on a cellular base station or on a server in the internet.

Figure 13:
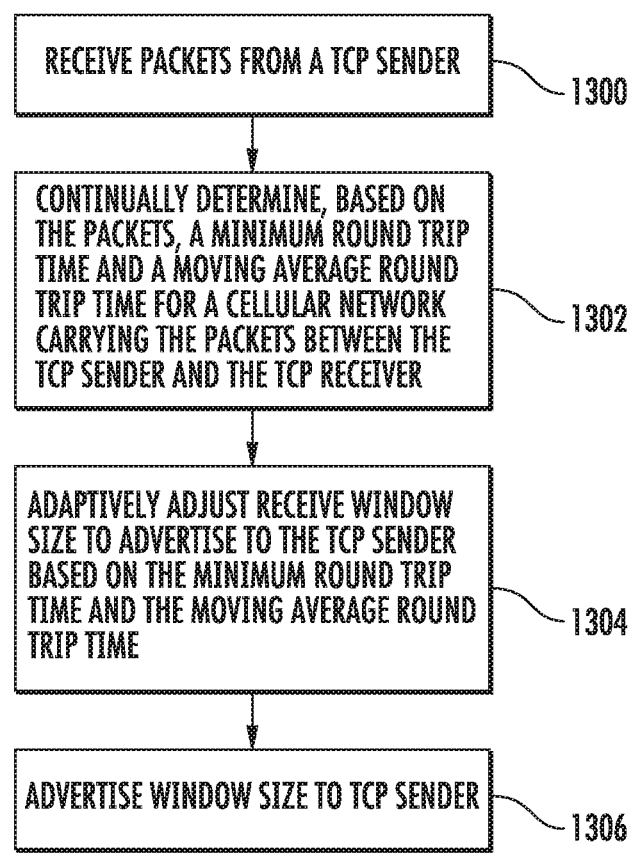
FIG. 13 is a flow chart illustrating an exemplary method for use at a TCP receiver for controlling TCP sender behavior in cellular communications networks with large buffer sizes according to an embodiment of the subject matter described herein.

FIG. 13 is a flow chart illustrating an exemplary method for use at a TCP receiver for controlling TCP sender behavior in cellular communications networks with large buffer sizes. Referring to FIG. 13, in step 1300, a TCP receiver receives packets from a TCP sender. For example, TCP receiver 100 illustrated in FIG. 12 may receive packets from TCP sender 102 via cellular network 106. In step 1302, the TCP receiver continually determines, based on the packets, a minimum round trip time and a moving average round trip time for a cellular network carrying the packets between the TCP sender and the TCP receiver. For example, dynamic receive window size adjustment module 104 illustrated in FIG. 12 may continually make the determination of minimum round trip time and moving average round trip time for packets received from TCP sender 102. In step 1304, the method includes adaptively adjusting a receive window size to advertise to the TCP sender based on the minimum round trip time and the moving average round trip time. For example, dynamic receive window size adjustment module 104 illustrated in FIG. 12 may adaptively adjust the receive window size to advertise to TCP sender 102 using any of the QRS algorithms described herein. In step 1306, the method includes advertising the receive window size to the TCP sender. The receive window size may be advertised to the TCP sender using normal TCP window size advertisement mechanisms. The receive window size may be the window size that is dynamically calculated by dynamic receive window size adjustment module 104.

Figure 14:
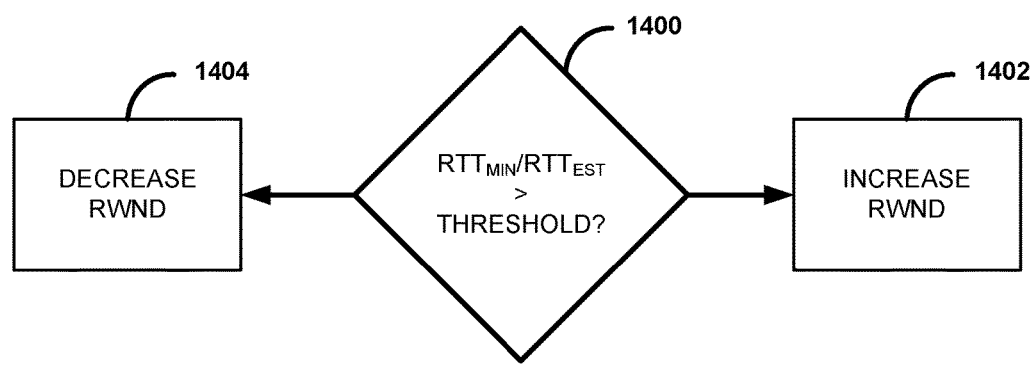
FIG. 14 is a flow chart illustrating exemplary adjustment of a receive window size according to an embodiment of the subject matter described herein.

FIG. 14 is a flow chart illustrating adjustment of a receive window size. Referring to FIG. 14, in step 1400, it is determined whether the ratio of the minimum round trip time and the moving average of the round trip time exceeds a threshold. If the ratio exceeds the threshold, control proceeds to step 1402 where the receive window size is increased. In step 1400, if the ratio does not exceed the threshold, control proceeds to step 1404 where the receive window size is decreased.

It will be understood that various details of the subject matter described herein may be changed without departing from the scope of the subject matter described herein. Furthermore, the foregoing description is for the purpose of illustration only, and not for the purpose of limitation.

REFERENCES

The disclosure of each of the following references is incorporated herein by reference in its entirety.
[1] tcpdump. www.tcpdump.org.
[2] ATHURALIYA, S., Low, S., LI, V., AND YIN, Q. REM: Active Queue Management *Network, IEEE* 15 (May 2001), 48-53.
[3] BRAKMO, L. S., O'MALLEY, S. W., AND PETERSON, L. L. TCP Vegas: New Techniques for Congestion Detection and Avoidance. In *Proceedings of the conference on Communications architectures, protocols and applications* (1994), SIGCOMM '94, pp. 24-35.
[4] FENG, W.-C., FISK, M., GARDNER, M. K., AND WEIGLE, E. Dynamic Right-Sizing: An Automated, Lightweight, and Scalable Technique for Enhancing Grid Performance. In *Proceedings of the 7th IFIP/IEEE International Workshop on Protocols for High Speed Networks* (2002), PIHSN '02, pp. 69-83.
[5] FLOYD, S., AND HENDERSON, T. The NewReno Modification to TCP's Fast Recovery Algorithm. IETF RFC 2582, April 1999.
[6] FLOYD, S., AND JACOBSON, V. Random Early Detection Gateways for Congestion Avoidance. *IEEE/ACM Trans. Netw.* 1 (August 1993), 397-413.
[7] GETTYS, J. Bufferbloat: Dark Buffers in the Internet. *Internet Computing, IEEE* 15, 3 (May-June 2011), 96.
[8] HA, S., RHEE, I., AND XU, L. CUBIC: a New TCP-friendly High-speed TCP Variant *SIGOPS Oper: Syst. Rev.* 42 (July 2008), 64-74.
[9] HEMMINGER, S. tcpprobe—Observe the TCP flow with k-probes. www.linuxfoundation.org/collaborate/workgroups/networking/tcpprobe.
[10] LAN, K.-c., AND HEIDEMANN, J. A Measurement Study of Correlations of Internet Flow Characteristics. *Comput. Netw.* 50 (January 2006), 46-62.
[11] Liu, X., CHONG, E. K. P., AND SHROFF, N. B. A Framework for Opportunistic Scheduling in Wireless Networks. *Comput. Netw.* 41 (March 2003), 451-474.
[12] Liu, X., SRIDHARAN, A., MACHIRAJU, S., SESHADRI, M., AND ZANG, H. Experiences in a 3G Network: Interplay between the Wireless Channel and Applications. In *Proceedings of the 14th ACM international conference on Mobile computing and networking* (2008), MobiCom '08, pp. 211-222.
[13] MATHIS, M., HEFFNER, J., AND REDDY, R. Web100: Extended TCP Instrumentation for Research, Education and Diagnosis. *SIGCOMM Comput. Commun. Rev* 33 (July 2003), 69-79.
[14] OSTERMANN, S. tcptrace, www.tcptrace.org.
[15] QIAN, F., GERBER, A., MAO, Z. M., SEN, S., SPATSCHECK, O., AND WILLINGER, W. TCP Revisited: a Fresh Look at TCP in the Wild. In *Proceedings of the 9th ACM SIGCOMM conference on Internet measurement conference* (2009), IMC '09, pp. 76-89.
[16] REED, D. P. What's wrong with this picture? The end2endinterest mailing list, September 2009.
[17] WEI, D. X., JIN, C., LOW, S. H., AND HEGDE, S. FAST TCP: Motivation, Architecture, Algorithms, Performance. *IEEE/ACM Trans. Netw.* 14 (December 2006), 1246-1259.
[18] Xu, L., HARFOUSH, K., AND RHEE, I. Binary Increase Congestion Control (BIC) for Fast Long-distance Networks. In *INFOCOM* 2004 (March 2004), pp. 2514-2524.
[19] YANG, P., LUO, W., XU, L., DEOGUN, T., AND LU, Y. TCP Congestion Avoidance Algorithm Identification. In *Distributed Computing Systems (ICDCS)*, 2011 31*st* *International Conference on* (June 2011), pp. 310-321.

What is claimed is:
1. A method for use at a TCP receiver for controlling TCP sender behavior in cellular communications networks with large buffer sizes, the method comprising:
  at a TCP receiver:
    receiving packets from a TCP sender;
    continually determining, based on the packets, a minimum round trip time and a moving average round trip time for a cellular network carrying the packets between the TCP sender and the TCP receiver;
    adaptively adjusting a receive window size to advertise to the TCP sender based on the minimum round trip time and the moving average round trip time; and
    advertising the adjusted receive window sizes to the TCP sender.
2. The method of claim 1 wherein the TCP receiver is implemented on a mobile handset and the TCP sender is implemented on a cellular base station or a server located in the Internet.

3. The method of claim 1 wherein adaptively adjusting the receive window size includes increasing the receive window size if a ratio of the minimum round trip time and the moving average round trip time is less than a threshold value.

4. The method of claim 1 wherein adaptively adjusting the receive window size includes decreasing the receive window size if a ratio of the minimum round trip time and the moving average round trip time is more than a threshold value.

5. A system for use at a TCP receiver for controlling TCP sender behavior in cellular communications networks with large buffer sizes, the system comprising:
- a TCP receiver for receiving packets from a TCP sender; and
- a dynamic receive window size adjustment module for continually determining, based on the packets, a minimum round trip time and a moving average round trip time for a cellular network carrying the packets between the TCP sender and the TCP receiver, adaptively adjusting a receive window size to advertise to the TCP sender based on the minimum round trip time and the moving average round trip time, and for advertising the adjusted receive window size to the TCP sender.

6. The system of claim 5 wherein the TCP sender is implemented on a cellular base station or on a server located in the Internet and wherein the TCP receiver is implemented on a mobile handset.

7. The system of claim 5 wherein adaptively adjusting the receive window size includes increasing the receive window size if a ratio of the minimum round trip time and the average round trip time is less than a threshold value.

8. The system of claim 5 wherein adaptively adjusting the receive window size includes decreasing the receive window size if a ratio of the minimum round trip time and the average round trip time is more than a threshold value.

9. A non-transitory computer readable medium comprising computer executable instructions that when executed by the processor of a computer control the computer to perform steps comprising:
at a TCP receiver:
- receiving packets from a TCP sender;
- continually determining, based on the packets, a minimum round trip time and a moving average round trip time for a cellular network carrying the packets between the TCP sender and the TCP receiver;
- adaptively adjusting a receive window size to advertise to the TCP sender based on the minimum round trip time and the moving average round trip time; and
- in response to a determination that at least one Wi-Fi signal is present, attempting to connect to the recommended access point.

10. The non-transitory computer readable medium of claim 9 wherein the TCP receiver is implemented on a mobile handset and the TCP sender is implemented on a cellular base station or a server located in the Internet.

11. The non-transitory computer readable medium of claim 9 wherein the TCP receiver is implemented on a mobile handset and the TCP sender is implemented on a cellular base station or a server located in the Internet.

12. The non-transitory computer readable medium of claim 9 wherein adaptively adjusting the receive window size includes increasing the receive window size if a ratio of the minimum round trip time and the moving average round trip time is less than a threshold value.

13. The non-transitory computer readable medium of claim 9 wherein adaptively adjusting the receive window size includes decreasing the receive window size if a ratio of the minimum round trip time and the moving average round trip time is more than a threshold value.

* * * * *